(No Model.)
M. B. ROSENSTOCK.
MECHANICAL MOVEMENT.
No. 309,880. Patented Dec. 30, 1884.
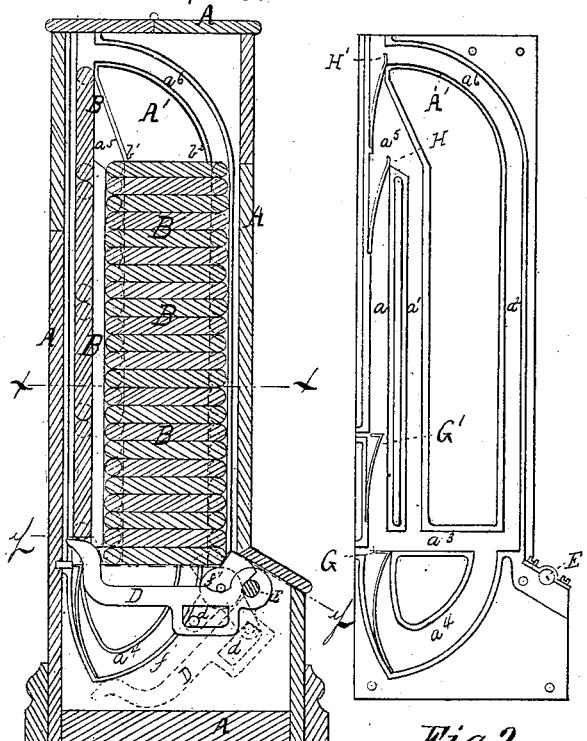
Fig 1.
Fig 2.
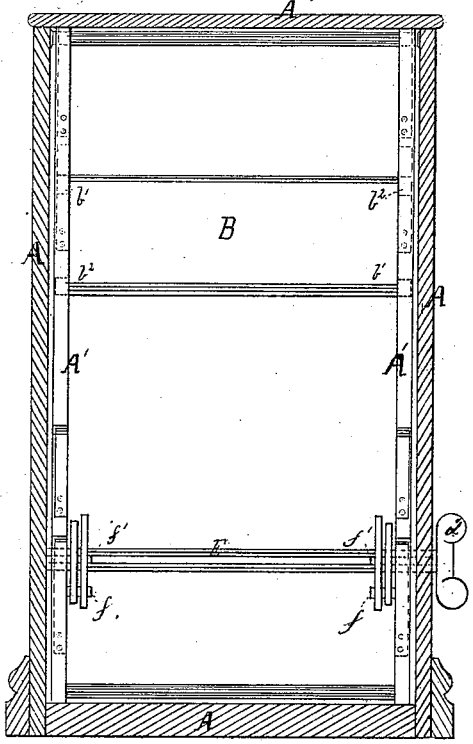
Fig 3.
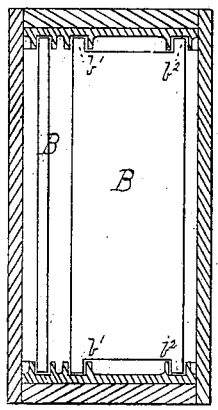
Fig 4.
Fig 6.
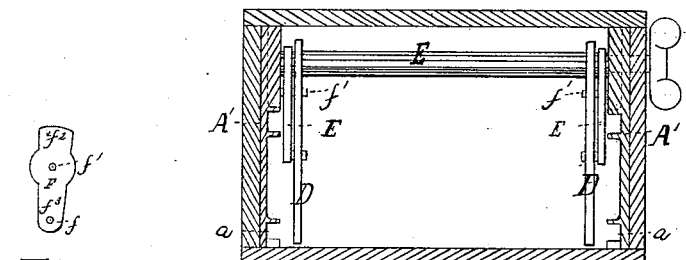
Fig 5.
Witnesses.
R. J. Phillips
L. W. Bender
Inventor
Morris B. Rosenstock
By his attorney
M. Randolph
N. PETERS. Photo-Lithographer. Washington. D. C.

UNITED STATES PATENT OFFICE.

MORRIS B. ROSENSTOCK, OF NEW YORK, N. Y.

MECHANICAL MOVEMENT.

SPECIFICATION forming part of Letters Patent No. 309,880, dated December 30, 1884.

Application filed October 15, 1883. Renewed May 14, 1884. (No model.)

*To all whom it may concern:*

Be it known that I, MORRIS B. ROSENSTOCK, of the city, county, and State of New York, have invented a new and useful Mechanical Movement for Displaying Photographic Views and for similar uses; and I hereby declare the following to be a full and clear description thereof.

The invention has for its object the movement of a series of sliding frames edgewise upwardly in a single pair of grooves or ways in the retaining-frame, and flatwise downwardly in two pairs of grooves in the retaining-frame, the downward and the upward grooves being constructed and connected together at their extremities, so as to allow the sliding frames to move readily from one position to the other; and the invention relates, specifically, to the mechanical device for moving said sliding frames, the mechanism for moving the frames consisting of a pair of lifting-levers attached radially to a rocking operating-shaft, and a pair of cams pivoted to the retaining-frame and operated by the lifting-levers, so as to slide the moving frames from the downward grooves to the upward grooves at the lower limit of their movement. The invention will be readily understood by reference being had to the accompanying drawings, of which—

Figure 1 is a transverse sectional elevation of a machine, showing the said improved mechanical movement. Fig. 2 is an elevation of the slides or ways and the frame or plate in which they are formed. Fig. 3 is a longitudinal sectional elevation of the improved mechanism. Figs. 4 and 5 are sectional plans taken, respectively, on the indicated section-lines $xx$ and $yy$ of Fig. 1. Fig. 6 is a detail of one of the cams.

A represents the inclosing-case in which the mechanism is housed, and A' the ways or retaining-frames in which the moving frames B slide.

As shown best in Figs. 1 and 4, there are three grooves, $a\ a'\ a^2$, in each of the way-frames A', the corresponding grooves, $a$, in the said frames A' constituting a pair of grooves or ways in which the said sliding frames move upwardly, and the corresponding grooves, $a'$ and $a^2$, in the two way-frames A' constituting two pairs of grooves in which the said moving frames B slide downwardly. The grooves $a'$ and $a^2$ terminate at their lower extremities in transverse grooves $a^3$, which connect at their front ends with the upward grooves $a$. The rear ends of the transverse grooves $a^3$ connect by means of downwardly-curving grooves $a^4$ with the lower and curved ends of the upward grooves $a$. The upper ends of the grooves or ways $a'\ a^2$ are connected, respectively, with the top ends of the grooves $a$ by means of the inclined slot $a^5$ and the curved grooves or ways $a^6$. The sliding frames B have two trunnions, $b'\ b^2$, at each of their ends. These trunnions are cylindrical in form, with one of their ends attached to the end of the said frame B. The diameters of these trunnions permit them to readily fit into the ways $a\ a'\ a^2$ and slide therein.

The operating mechanism consists of two levers, D, fixed radially to and operated by the rock-shaft E, and two cam-plates, F, pivoted to the contiguous sides of the way-frames A', and operated by the levers D by means of wrist-pins $f$, which are engaged in and moved by the slots $d$ of the said lever D. The rock-shaft is operated by the thumb-piece $d'$, in which its outer end terminates outside of the inclosing-case A. The operator rocks this shaft back and forth to the limits of its movements which are stopped by the pivot-pins $f'$, with which the cam-plates F are fulcrumed to the stationary plates A', and by the wrist-pins $f$ which assemble the levers and the cam-plates together, the latter limiting the downward movement of the levers by the contact of the said wrist-pins with the ends of the slots $d$, in which they move, and the fulcrum-pins $f''$ by the contact of the upper edges of the levers with them as they reach the upward limit of their movements.

The cams F each consist of a cylindrical hub part, and an upwardly-projecting arm, $f^2$, and a downwardly-projecting arm, $f^3$. A pivot-pin, $f'$, placed centrally through the hub part, pivots the cam to the stationary plate A', and the wrist-pin $f$, projecting from and attached to the lower arm, $f^3$, of the said cam-plate, is engaged in and moved by the slot $d$ of the actuating-lever D.

The parts are assembled together so that the hub part of the said cam-plate will extend no higher than the bottom of the transverse groove $a^2$, and the cam-plate F is made so that its upward arm $f^2$ extends upward to the top of the transverse groove $a^3$ and terminates in a segmental curve on that line.

The parts are so constructed and assembled together that when the levers D are thrown upward to the limit of their movement the front edge of the upper part or segmental arm $f^2$ rests against the rear edge of the bottom one of the horizontally-disposed slides or moving frames B. Then, as the levers D are moved down to the lower limit of their movement, as indicated by the dotted lines in Fig. 1, the wrist-pins $f$ will throw the lower ends of the said cam-plates down and back, and consequently the upper ends of the said cam-plates forward, and this movement carries or moves the slides B forward in the transverse grooves $a^3$ far enough to allow the forward trunnions, $b'$, to enter the upward grooves $a$, and the rear trunnions, $b^2$, to enter the downwardly-curved grooves $a^4$, at which point the springs G receive the upper or forward trunnions, $b'$, and hold them up, allowing the rear part of the said slide B to swing downwardly through the grooves $a^4$, and the trunnions $b^2$ to enter the lower ends of the grooves $a$. The next forward movement of the levers D lifts the lowest or last-received frame B up edgewise in the rising grooves $a$, and with it all the superincumbent slides, which are above the lowest one of the said series and resting upon it. There are two of the springs G—one on each of the sliding frames or ways—and above these there are also two other similar springs, G'. The said springs G and G' are fixed to the sides of the ways $a$, into which they are housed, so as to leave the said ways or grooves full size for the passage of the trunnions of the slides B. The upper ends of the said springs terminate in transverse arms which slide into recesses in the ways when the springs are thrown back. These springs, arranged as shown in Fig. 3, offer no impediment to the upper movement of the frames in the said ways $a$, but they prevent the said frames moving downwardly, the transverse upper ends of the said springs pressing habitually out into the said grooves $a$ and under the trunnions of the sliding frames, so as to hold them up. The tops of the springs G' are placed above the tops of the springs G just a sufficient distance to hold up the column of slides in the grooves $a$ above the transverse grooves $a^3$, and allow the bottom frame B to be swung into place with its upper trunnions resting on the tops of the lower springs, G.

The machine, constructed as above described, is operated as follows, viz: The frames B are placed in the ways $a$, edge to edge above the tops of the springs G, and flatwise in the grooves or ways $a'$ $a^2$, from the transverse grooves $a^3$ up to the bottom of the curved grooves $a^6$ at the top of the ways. The topmost one of the frames B in the grooves $a$ rests with its lower trunnions in the said grooves $a$ just below the opening of the slot $a^5$, and its upper trunnions in the said grooves $a$, just below the top ends of the curved grooves $a^6$. In this way the said topmost slide or frame B of the vertical series is held up in a vertical position by the ways $a$, in which it rests, and the lowest one of the vertical series of the said slides is held up by the springs G', which rest under its upper trunnions. At the next full stroke of the operating-shaft E and its levers D the lowest one of the horizontally-disposed slides is pushed up under the column of slides in the ways $a$, and raises the topmost of the said slides to the full limit of its upward movement, in which position its lower and upper trunnions will be respectively opposite the slots $a^5$ and the top ends of the curved grooves $a^6$, and in this position the lateral springs H and H', fixed in the grooves $a$ for that purpose, will push the said topmost slide B back into the slots $a^5$ and grooves $a^6$, and it immediately falls down through the said slots and grooves by the action of gravity, so that its trunnions rest in the downward grooves $a'$ and $a^2$. In this manner the sliding frames B are successively moved from the downward grooves or ways into the upward grooves or ways, and from the latter to the former, so as to show each one of the said sliding frames in succession in a vertical position at the top ends of the ways or grooves $a$, as above described.

Having described my invention, I claim—

1. The combination of a series of movable frames having a pair of trunnions at each of their ends, a retaining-frame having a system of ways or grooves connected together at their extremities, to permit of the frames sliding in both vertical and horizontal directions, a pair of levers, and mechanism, substantially as described, for imparting thereto an intermittent movement, whereby said frames are moved upwardly, the whole being constructed, arranged, and operating substantially as and for the purpose set forth.

2. The combination, with the grooved retaining-frame and a series of sliding frames, substantially as described, of mechanism, as described, for moving and lifting said sliding frames, said mechanism consisting, essentially, of an operating rock-shaft, a pair of levers radially attached to said operating rock-shaft, and a pair of cam-plates pivoted to the retaining-frame, and adapted to be operated by said levers, substantially as and for the purpose set forth.

MORRIS B. ROSENSTOCK.

Witnesses:
M. RANDOLPH,
R. G. PHILLIPS.